(12) United States Patent
Berg et al.

(10) Patent No.: US 6,931,832 B2
(45) Date of Patent: Aug. 23, 2005

(54) MONOPROPELLANT COMBUSTION SYSTEM

(75) Inventors: Gerald R. Berg, Renton, WA (US); Donn C. Mueller, Allston, MA (US); Mark W. Parish, Burien, WA (US)

(73) Assignee: United Technologies Corporation, Hartford, CT (US)

( * ) Notice: Subject to any disclaimer, the term of this patent is extended or adjusted under 35 U.S.C. 154(b) by 57 days.

(21) Appl. No.: 10/436,861

(22) Filed: May 13, 2003

(65) Prior Publication Data

US 2004/0226280 A1 Nov. 18, 2004

(51) Int. Cl.[7] .................................................. F02K 9/42
(52) U.S. Cl. ............................ 60/206; 60/207; 60/218; 60/260
(58) Field of Search .......................... 60/204, 205, 206, 60/207, 218, 257, 260

(56) References Cited

U.S. PATENT DOCUMENTS

| | | | |
|---|---|---|---|
| 5,223,057 A | * | 6/1993 | Mueller et al. ............... 149/45 |
| 5,485,722 A | | 1/1996 | Schmidt et al. |
| 5,608,179 A | | 3/1997 | Voecks et al. |
| 5,768,885 A | * | 6/1998 | Johnson et al. ............... 60/204 |
| 6,047,541 A | * | 4/2000 | Hampsten .................... 60/259 |
| 6,505,463 B2 | * | 1/2003 | Kruse et al. .................. 60/218 |

* cited by examiner

*Primary Examiner*—Ehud Gartenberg
(74) *Attorney, Agent, or Firm*—Bachman & LaPointe, P.C.

(57) ABSTRACT

An apparatus and method are provided for decomposition of a propellant. The propellant includes an ionic salt and an additional fuel. Means are provided for decomposing a major portion of the ionic salt. Means are provided for combusting the additional fuel and decomposition products of the ionic salt.

28 Claims, 6 Drawing Sheets

MONOPROPELLANT COMBUSTION SYSTEM

U.S. GOVERNMENT RIGHTS

The invention was made with U.S. Government support under contract NAS3-01008 awarded by the National Aeronautics and Space Administration (NASA). The U.S. Government has certain rights in the invention.

BACKGROUND OF THE INVENTION (1) Field of the Invention

The invention relates to propellant combustion. More particularly, the invention relates to combustion of monopropellants.

(2) Description of the Related Art

Use of monopropellants is known in rocket propulsion and auxiliary/emergency power generation. U.S. Pat. No. 5,485,722 identifies the catalytic decomposition/combustion of hydroxylammonium nitrate (HAN)-based monopropellants. In general most HAN-based propellants are mixtures of three primary components: HAN, water, and a fuel. For miscibility the fuel is typically ionic, partly ionic, or polar. The fuel may be an ionic salt like HAN. Triethanol ammonium nitrate (TEAN) and 2-hydroxyethyl-hydrazine nitrate (HEHN) are two of the most common organic types. Partly ionic fuels may include amino acids (e.g., glycine). Polar fuels may include alcohols (e.g., ethanol or methanol). Most of these propellant mixtures are roughly 60%–80% HAN. HAN concentrations may be reduced by addition of more water. This has been used to lower combustion temperatures to levels survivable by materials involved in traditional monopropellant thrusters. Some of the more exotic mixtures use small amounts of ammonium nitrate as a further oxidant and/or mix multiple fuels into the blend.

SUMMARY OF THE INVENTION

Accordingly, one aspect of the invention involves an apparatus having a source of HAN-based propellant. A reactor dissociates a major portion of the HAN in the propellant. A combustor combusts products of the dissociation with an additional fuel in the propellant. In various implementations, the propellant may comprise a mixture of the HAN, the additional fuel including alcohol, and water. The source may include a tank containing the propellant and an automatically-controlled valve governing flow between the tank and the reactor. The reactor may include a circuitous heated passageway. The reactor may include a catalyst bed through which the propellant passes. There may be a porous barrier between the reactor and the combustor. There may be means for feeding back heat from the combustor to the reactor. A turbine may be driven by products of the combustion. A generator may be driven by the turbine. A hydraulic pump may be driven by the turbine. The apparatus may include a hull for supporting the apparatus within a body of water. The apparatus may include a propeller driven by the turbine to propel the apparatus through the body of water. The apparatus may include an explosive warhead.

Another aspect of the invention involves a method for operating a combustion system using a HAN-based propellant. The propellant is introduced to a reactor. The propellant is decomposed in the reactor to dissociate at least a major portion of the HAN. An output of the reactor is directed to a combustor. The output is combusted in the combustor so as to combust dissociation products of the dissociation HAN with unreacted fuel in the propellant. In various implementations, the combusting may release at least 60% of an energy of the propellant. The decomposing may decompose a majority of the HAN in the propellant. The decomposing may include passing propellant through a porous catalyst. The directing may include passing reaction products through a porous barrier. The directing may include counterflow passing of reaction products relative to combustion products. The method may include feeding back heat from the combustor to the reactor in an amount effective to initiate the decomposing.

Another aspect of the invention involves an apparatus including a source of propellant. The propellant includes at least 50%, by weight, of an ionic salt and an additional fuel. The apparatus includes means for decomposing a major portion of the ionic salt. The apparatus includes means for combusting the additional fuel and the decomposition products. In various implementations, the propellant may include a mixture of HAN, alcohol, and at least 5% water. The means for decomposing may include a porous catalyst bed. The additional fuel may include one or more organic ionic salts.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
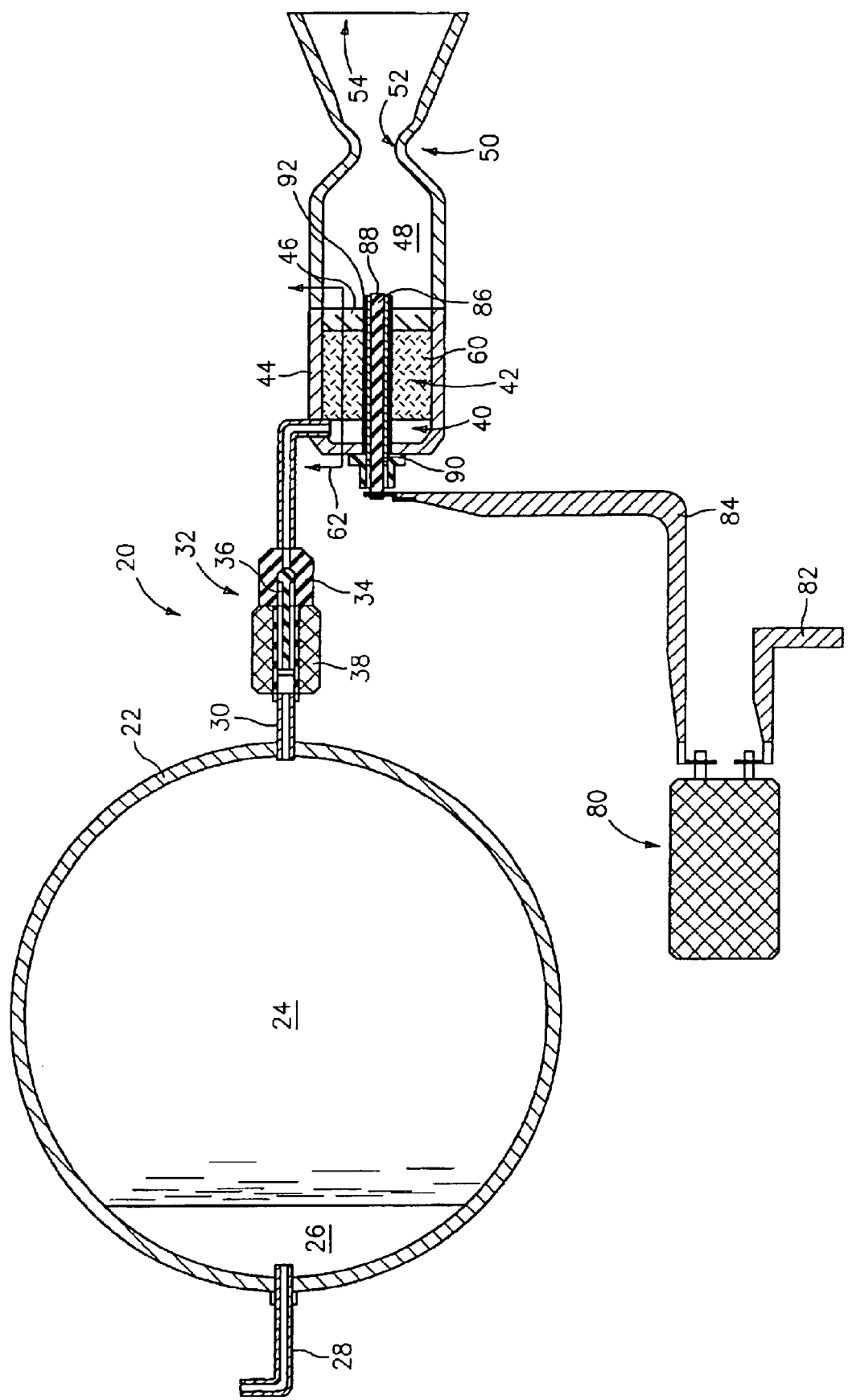
FIG. 1 is a partially schematic view of a thruster system.

FIG. 1 shows an exemplary system 20 configured for use as a rocket thruster (e.g., for a spacecraft). The system includes a pressure vessel or tank 22 containing a body 24 of monopropellant. A headspace 26 of the tank is pressurized with an inert gas (e.g., helium) such as via a pressurization tube 28 penetrating an upper end of the tank. A lower end of the tank is penetrated by an outlet conduit 30 having therein a valve 32 controlled by a spacecraft control system (not shown). An exemplary valve 32 is a solenoid valve having a body 34 with an outlet port sealable by a downstream head of a piston 36 whose position is controlled via a coil 38. Downstream of the valve 32, the conduit 30 extends to a headspace 40 of a decomposition chamber or fume reactor 42. The exemplary decomposition chamber 42 is formed in an upstream portion of a vessel 44 separated from a downstream portion by a porous thermal barrier 46 (e.g., aluminum oxide or zirconium oxide). The downstream portion serves as a combustion chamber 48 with a convergent/divergent nozzle 50 having a throat 52 and an outlet 54. Downstream of the headspace 40 the decomposition chamber 42 contains means for facilitating decomposition of the monopropellant. Exemplary means may include a catalyst (e.g., rhenium) bed 60 between the headspace 40 and barrier 46 and/or a heater 62 (e.g., electric heater or fluidic conductive heater). In an exemplary operation, the heater (if present) is engaged to preheat the decomposition chamber whereupon the valve 32 is open to admit monopropellant to the decomposition chamber. In a discrete charge mode of operation, the valve may then be closed. In a continuous mode of operation, the valve may be left open. The heat and/or catalytic reaction causes the HAN to decompose into warm gaseous products. These products along with fuel vapor or particles and miscellaneous components (e.g., water vapor) flow through the barrier 46 into the combustion chamber 48. In alternative embodiments, the decomposition and combustion chambers may be remote of each other and the communication of the decomposition chamber output products may be via appropriate conduits and controlled via appropriate valves.

Means may be provided for triggering combustion within the combustion chamber. Exemplary means include a high voltage coil 80 having respective terminals coupled to a ground conductor 82 and a high voltage conductor 84. The high voltage conductor is, in turn, coupled to a spark electrode (e.g., anode) 86 having an operative distal end 88 in the combustion chamber. The coil may be coupled to the control system for operation in either discrete or continuous modes. The exemplary anode 86 is concentrically surrounded by an insulator 90 separating the anode from a cathode sleeve 92 which may be coupled to ground. The thermal conductive properties of the vessel 44 and barrier 46 may be selected to limit feedback of heat from the combustion chamber to the decomposition chamber. However, these properties may advantageously be selected to permit sufficient heat feedback to encourage the fumeoff reaction within the decomposition chamber while not permitting any (or at least substantial) combustion within the decomposition chamber. Alternative combustion triggering mechanisms to the spark igniter involve hot wire igniters and/or glow plugs.

An exemplary monopropellant comprises HAN, an additional fuel (e.g., an alcohol such as methanol) and water. Various examples are identified above. A group of these monopropellants may generally be characterized as having a major portion (e.g., at least about 75% (percentages by weight unless otherwise indicated)) of one or more ionic salts. Water contents are in the vicinity of at least 4%, more narrowly, 5–20%. Other fuel, if present, may be in the vicinity of up to about 20%. Particularly interesting monopropellants are HAN-based (i.e., at least 50% HAN by weight or, more broadly, at least 50% of the non-water mass). The decomposition chamber's fumeoff reaction entails evaporation of the water and dissociation of the HAN into gaseous products (oxidizers and water vapor). The additional fuel will evaporate if it is appropriately volatile (e.g., if alcohol or a light amino acid) or disperse with the gaseous fume products as minute molten particles. The dissociation is via a partial exothermic reaction essentially of the HAN such as:

$$7\ HAN \rightarrow 4N_2O + N_2 + 4HNO_3 + 12H_2O$$

with minor amounts (e.g., ~3% by weight) of NO & $NO_2$.

The presence of alcohol and water serve to reduce the effective reaction temperature. The theoretical temperature of this reaction is ~560° C. (above the auto-ignition temperature of the gaseous mixture) but, due to the heat absorption by water and fuel evaporation and the heat loss to the system, will be less than theoretical. An exemplary actual temperature will be in the vicinity of 500K (e.g., less than 800K and more narrowly, between 400K and 700K. The heat generated by the reaction largely vaporizes the alcohol and water without major reaction of these compounds. Initially, the decomposition chamber should be hot enough to initiate the reaction (e.g., about 120–130° C. in a vacuum but potentially less with a catalyst bed). Exemplary fumeoff pressures are in the vicinity of 100 to 200 psia, more narrowly, 150–200 psia. The decomposition chamber pressure is advantageously slightly higher than combustion chamber pressure which is application dependent. Successful decomposition operation will have complete fuming (no pooling) with small amounts of combustion (e.g., 5–15%) being acceptable. By way of example, a weight percent mixture of 75.4% HAN, 16.0% methanol, and 8.6% water may react at one atmosphere at an approximate temperature somewhat over 400K. Pure HAN reacted at that pressure would have an associated temperature over 800K.

The combustion occurs with substantially higher peak temperatures and pressures. By way of example, combustion may produce temperatures well over 2000K and peak pressures well over 1000 psia. The combustion of the gaseous products releases the majority of the energy of the mixture (e.g., about 80% for the exemplary mixture, more broadly, 60–95%, and 70–85%). For efficiency of near complete combustion, advantageously there is no to minimal nonfuming, pooling, and/or exploding in the decomposition chamber. Such performance will be dependent upon mixing and flow characteristics that may be unique to each application. Advantageously, overall combustion is at least 95%. The combustion temperature will depend on the thermal management system of each thruster application and the propellant mixture. The combustion is via an exothermic reaction of the HAN decomposition products with the unreacted fuel, for which the two key reactions are between the HAN's nitrous oxide and nitric acid on the one hand and the fuel on the other hand. For example, with methanol fuel:

$$3N_2O + CH_3OH \rightarrow 2H_2O + CO_2 + 3N_2$$

$$6HNO_3 + 5CH_3OH \rightarrow 13H_2O + 5CO_2 + 3N_2$$

In situations wherein the monopropellant includes both HAN and another salt such as TEAN or HEHN, this other salt advantageously serves the role of the alcohol by substantially reacting only in the combustor. Such fuel components would be expected to be carried as minute molten particles from the decomposition chamber to the combustion chamber in the flow of HAN decomposition products.

The physical separation of HAN decomposition and fuel combustion may be used for one or more purposes. These may include providing high numbers of cycles and high reliability of ignition. Direct monopropellant ignition may suffer from reliability problems. The use of a catalyst may improve reliability. However, if the catalyst or other decomposition means is exposed to the extreme heat of combustion, it may be expended over a short number of cycles. Decomposition remote from combustion may provide the combustion chamber with input that may be reliably ignited while protecting the decomposition means and permitting their reuse over a large number of cycles. The number of cycles required will vary based upon the given application. For many applications, it would be advantageous to configure the thermal isolation of the decomposition chamber (in view of its physical parameters and the parameters of a particular required combustion (including cycle time)) so as to preserve the decomposition means for at least one hundred cycles. In some applications, the desired number of cycles may exceed ten thousand.

Figure 2:
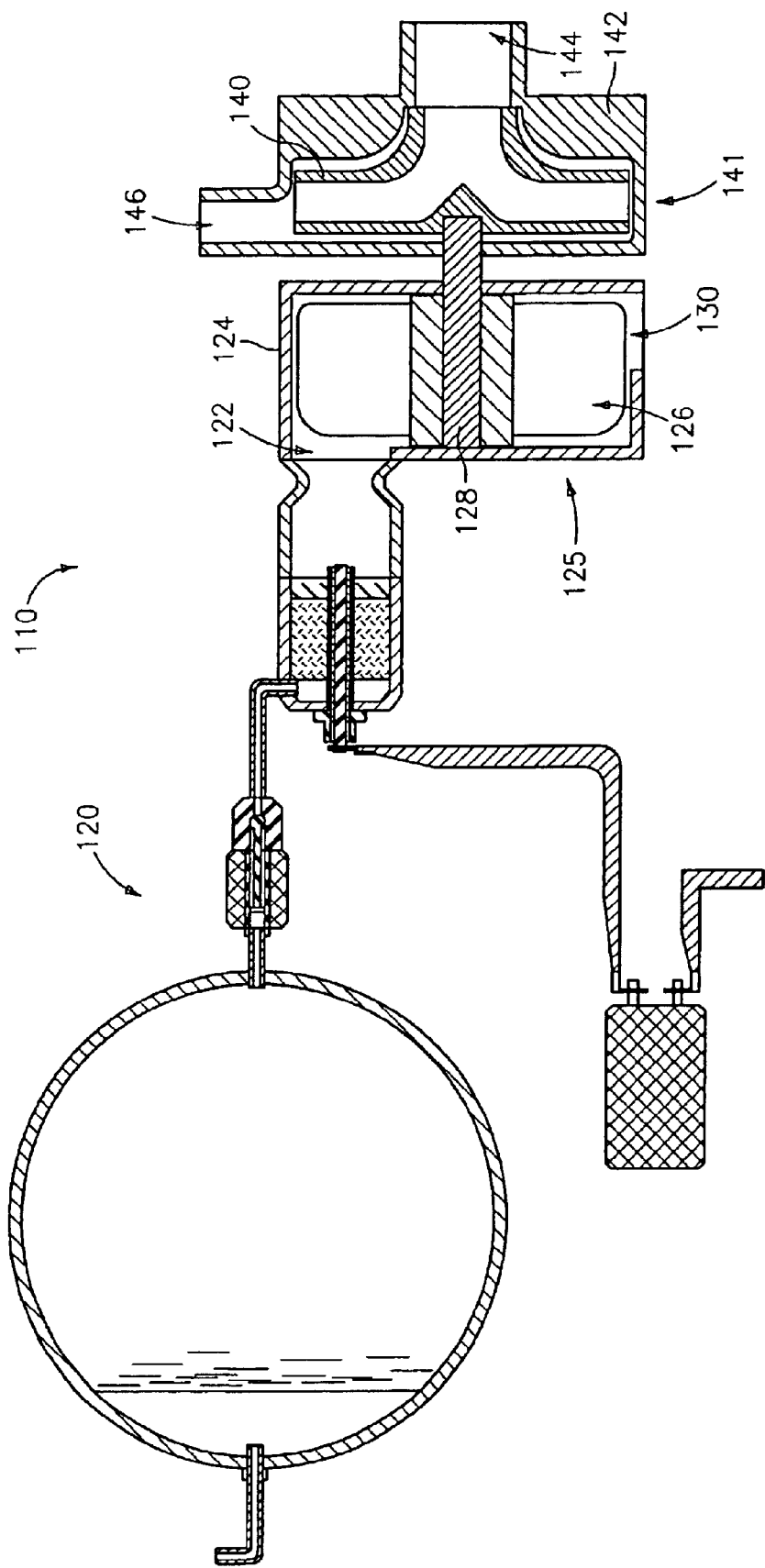
FIG. 2 is a partially schematic view of a first emergency power unit system.
Figure 3:
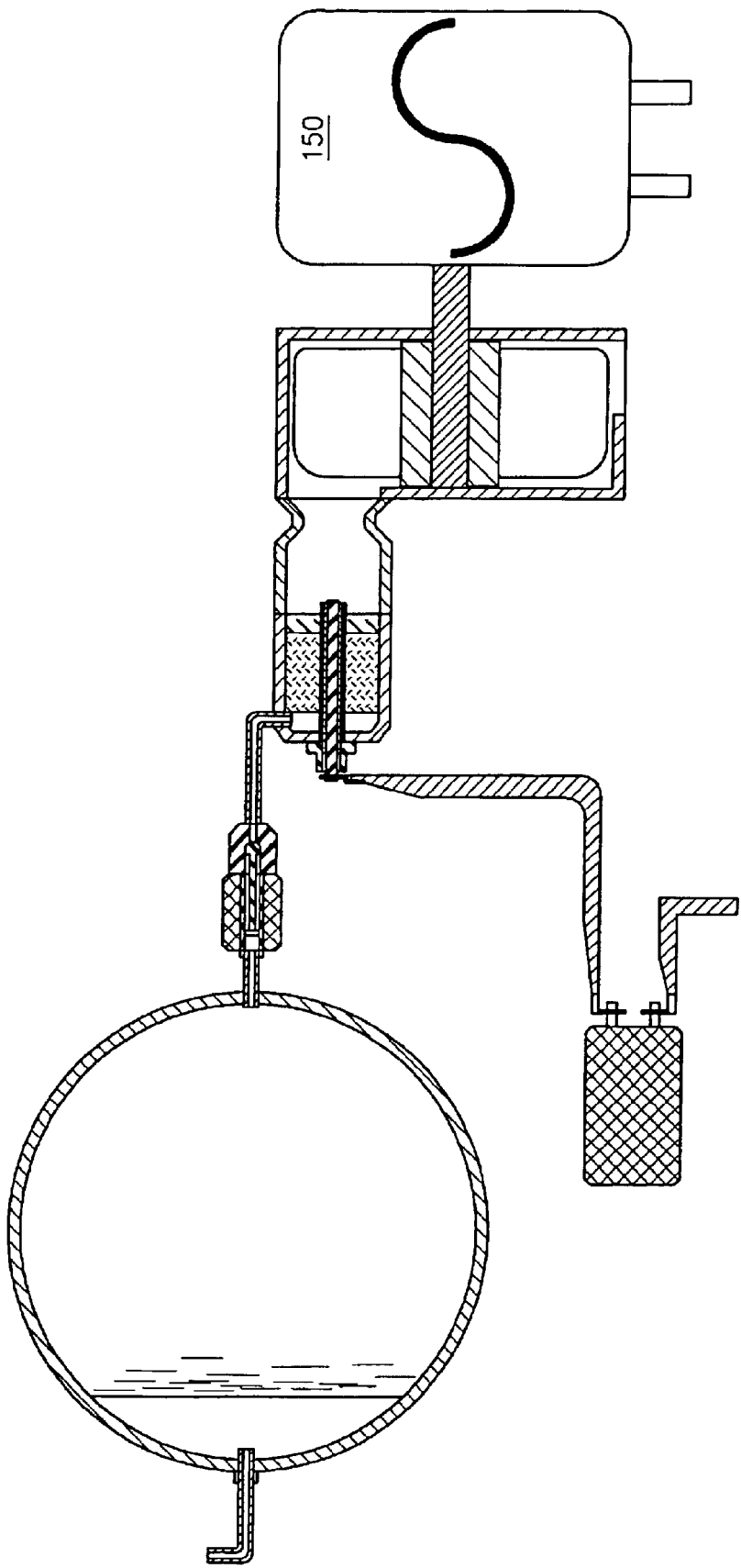
FIG. 3 is a partially schematic view of a second emergency power unit system.

FIG. 2 shows a system 110 configured for use as a hydraulic emergency power unit (EPU) for an aircraft. A decomposition/combustion subsystem 120 may be generally similar to the system 20 of FIG. 1 and is not discussed separately. The outlet of the combustion chamber of the subsystem 120 is coupled to the inlet 122 of a case 124 of a turbine subsystem 125. The exhaust products discharged by the subsystem 120 are used to drive a turbine 126 having a shaft 128 mounted within the case for rotation about a shaft axis. The exhaust products pass through the case and are discharged from an outlet 130. The shaft couples the turbine to an impeller 140 of a centrifugal pump 141. The pump has a case 142 with an inlet 144 and outlet 146 for pumping hydraulic fluid for the EPU. Alternate EPUs may utilize an electric generator 150 (FIG. 3) in lieu of or addition to the pump.

Figure 4:
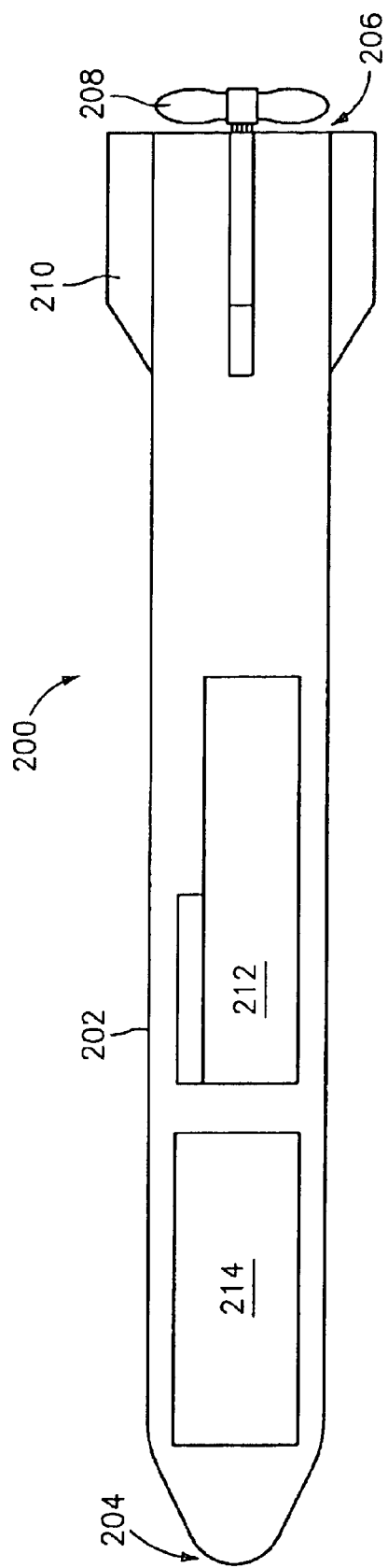
FIG. 4 is a partially schematic view of a torpedo.
Figure 5:
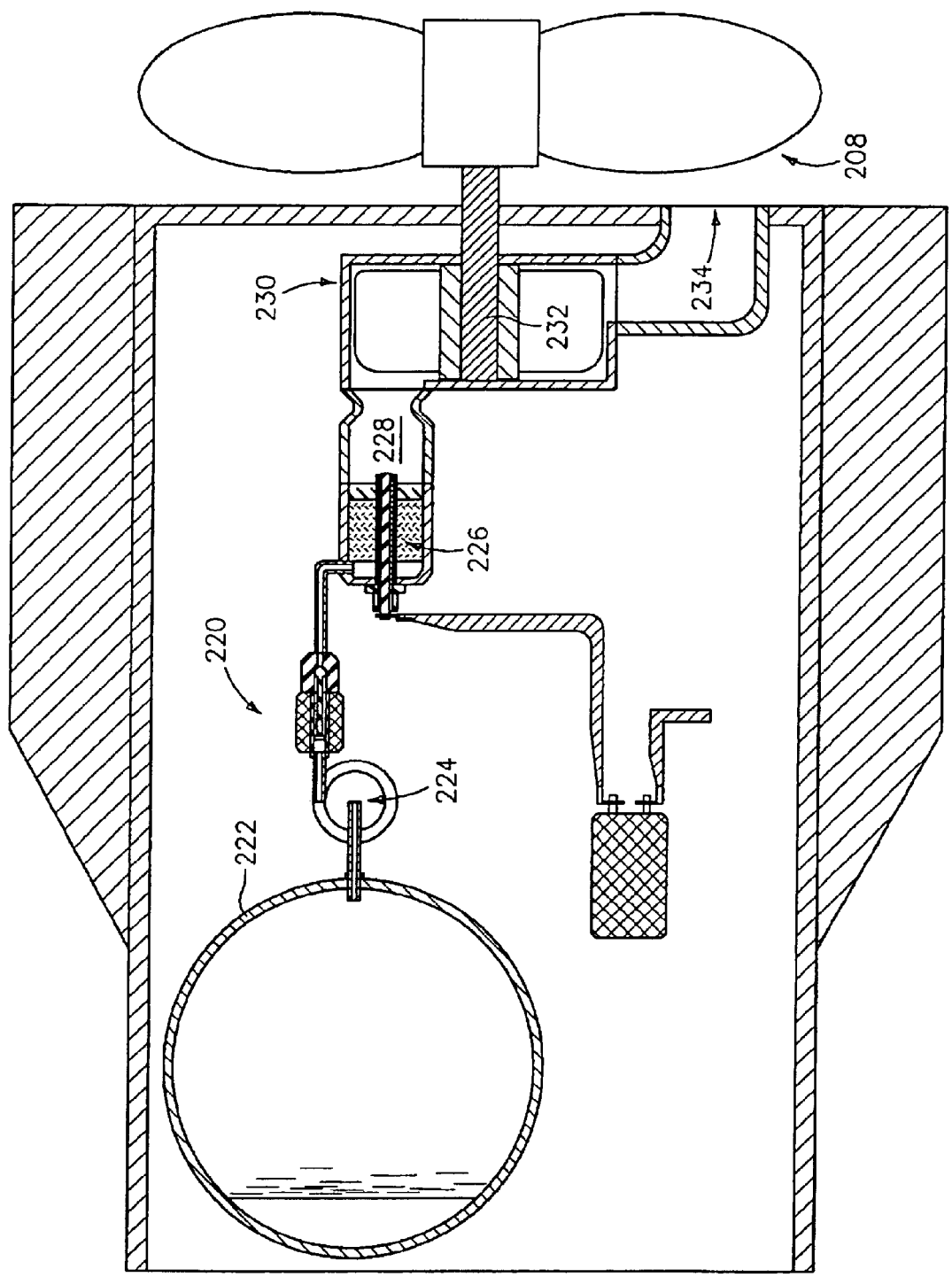
FIG. 5 is a partially schematic view of a propulsion system of the torpedo of FIG. 4.

FIG. 4 shows a torpedo 200 having a hull 202 extending from a bow or nose 204 to a stem or tail 206. At the stern, the torpedo has a propeller 208 and a number of guidance fins 210 providing control surfaces. A control system 212 controls the guidance fins and is coupled to an explosive warhead 214 within the hull. The control system is also coupled to a decomposition/combustion subsystem 220 (FIG. 5) which may be generally similar to the system 20. The illustrated subsystem 220 does not similarly pressurize its tank 222, instead relying on a pump 224 between the tank and the decomposition chamber 226. As with the EPU embodiments, the exhaust from the combustion chamber 228 may be directed to a turbine system 230. The shaft 232 of the turbine is, in turn, coupled to the propeller 208 to drive the propeller about the shaft axis to propel the torpedo through the water. The exhaust may be discharged into the water via a turbine outlet 234.

Figure 6:
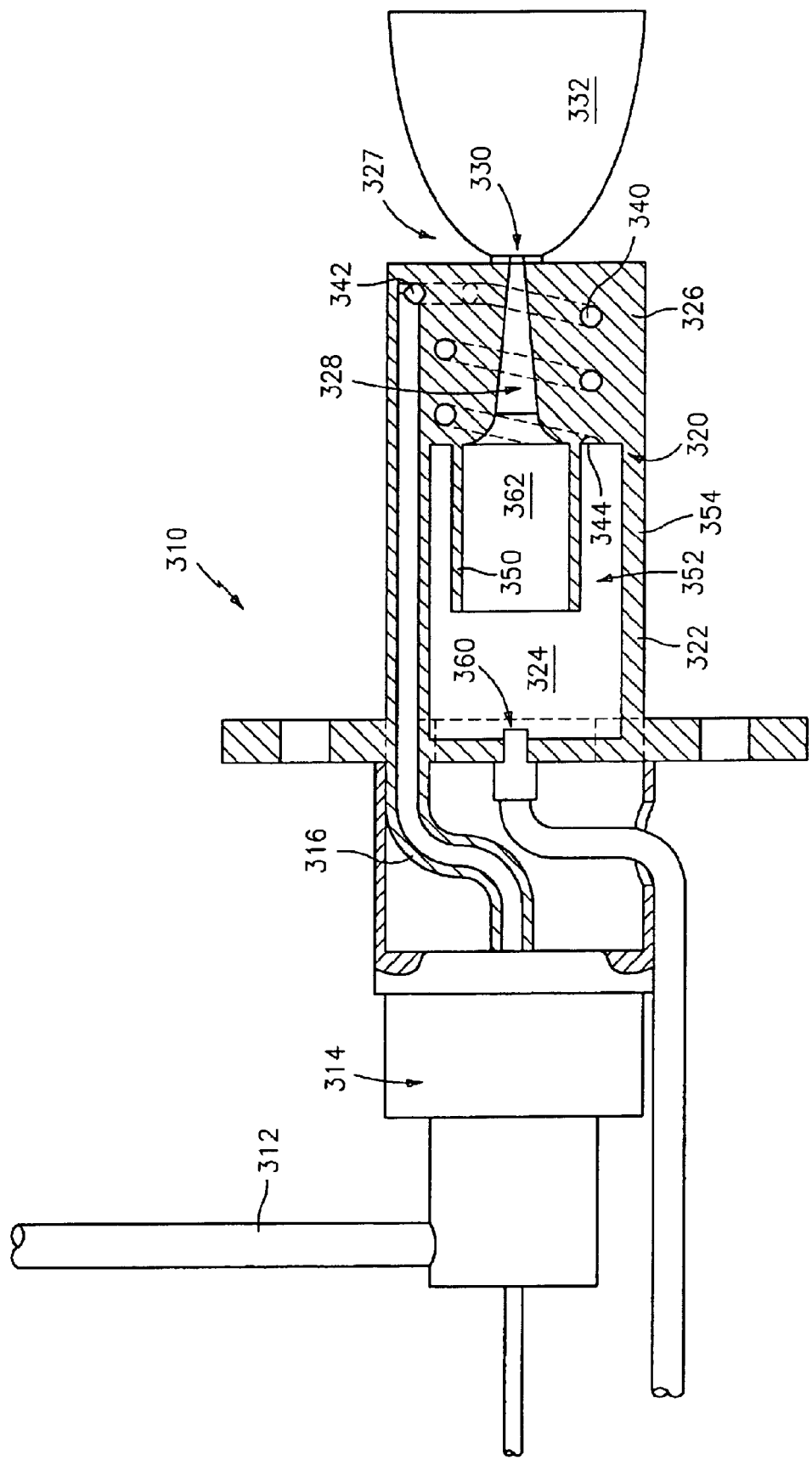
FIG. 6 is a partially schematic view of an alternate thruster system.

FIG. 6 shows an alternate thruster system to that of FIG. 1. The system 310 has a monopropellant inlet conduit 312 directing the monopropellant from a source (e.g., a tank as heretofore described) to a solenoid valve 314. A length 316 of this conduit downstream of the valve extends to a combustor/thruster body 320. In the exemplary embodiment, the thruster body has an upstream portion 322 surrounding a combustion chamber 324 and a high thermal mass downstream portion 326 surrounding a portion of the nozzle 327. In the exemplary embodiment, it surrounds and defines a major portion of the converging volume 328 of the nozzle upstream of the throat 330. The diverging volume 332 downstream of the throat may be defined by a separate element. The body downstream portion 326 bounds a circuitous aft-to-fore counterflow path 340 for the monopropellant. The exemplary path is shown bounded by a helical passageway having an inlet 342 from the conduit 316 and an outlet 344 at the downstream end of the combustion chamber. In the exemplary embodiment, the outlet 344 is at an outboard portion of the combustion chamber separated from a downstream inboard portion by an annular wall 350. In the exemplary embodiment, monopropellant flowing along the circuitous passageway is decomposed at least in part by heat of exhaust products expelled through the volume 328 in a counterflow heat exchange. Additional catalyst may be provided within the passageway or upstream thereof. The decomposed output exiting the passageway outlet 344 passes forward through the annular space 352 between a combustion chamber outer wall 354 of the body upstream portion and inner wall 350. Reaching a forward/upstream end of the combustion chamber, the output is ignited via an igniter 360 and discharged downstream through the interior 362 of the annular wall 350 and therefrom through the volume throat 330 and volume 332. During this passage, as described above, thermal conduction through the surface bounding the volume 328 assists in the decomposition of further monopropellant. Advantageously, the thermal conductive properties of the body 326 are selected to provide an advantageous level of decomposition.

One or more embodiments of the present invention have been described. Nevertheless, it will be understood that various modifications may be made without departing from the spirit and scope of the invention. For example, details of any particular use will influence details of appropriate implementations. Accordingly, other embodiments are within the scope of the following claims.

What is claimed is:

1. An apparatus comprising:

a source of HAN-based propellant;

a reactor for dissociating a portion of the HAN in the propellant; and a combustor having an upstream end and a downstream end for combusting products of the dissociation with an additional fuel in the propellant, wherein the reactor is located aft of said downstream end.

2. The apparatus of claim 1 wherein:

the propellant comprises a mixture of said HAN, said additional fuel comprising alcohol, and water.

3. The apparatus of claim 1 wherein:

the source comprises a tank containing the propellant and an automatically-controlled valve governing flow between the tank and the reactor.

4. The apparatus of claim 1 wherein:

the reactor comprises a circuitous heated passageway.

5. The apparatus of claim 1 further comprising:

means for feeding back heat from the combustor to the reactor.

6. A method for operating a combustion system using a HAN-based propellant, said combustion system having a combustor having an upstream end and a downstream end, comprising:

introducing the propellant to a reactor located substantially aft of said downstream end;

decomposing the propellant in the reactor to dissociate at least a portion of the HAN in the propellant;

directing an output of the reactor to the combustor; and combusting said output of the reactor in the combustor so as to combust dissociation products of said dissociated HAN with unreacted fuel in the propellant.

7. The method of claim 6 wherein:

the combusting releases at least 60% of an energy of the propellant.

8. The method of claim 6 further comprising:

feeding back heat from the combustor to the reactor in an amount effective to initiate said decomposing.

9. An apparatus comprising:

a source of propellant said propellant comprising an ionic salt and an additional fuel;

means for decomposing a portion of said ionic salt; and means for combusting additional fuel and decomposition products of said portion, said means for combustion having an upstream end and a downstream end and said means for decomposing located substantially aft of said downstream end.

10. The apparatus of claim 9 wherein:

the propellant comprises a mixture of HAN, alcohol, and at least 5% water.

11. The apparatus of claim 9 wherein:

the ionic salt is an inorganic ionic salt and the additional fuel includes an organic ionic salt.

12. The apparatus of claim 1 wherein:

the reactor comprises a passageway;

said propellant flowing along the passageway is decomposed at least in part by heat of exhaust products to produce a decomposed output; and the decomposed output is ignited to produce said exhaust products.

13. The apparatus of claim 12 wherein:

the passageway is helical.

14. The apparatus of claim 1 wherein:

the reactor lacks a catalyst, the dissociating being non-catalytic thermal dissociating.

15. The apparatus of claim 1 wherein:

the propellant is contained in a single tank.

16. The apparatus of claim 1 wherein:

the reactor is formed in an upstream portion of a vessel;

the combustor is formed in a downstream portion of the vessel; and the combustor has a convergent/divergent nozzle.

17. An apparatus comprising:

a source of propellant, said propellant comprising an ionic salt and an additional fuel;

a combustor having an upstream end and a downstream end and discharging combustion products; and a heat exchanger located substantially aft of said downstream end and transferring heat from the combustion products to the propellant to thermally decompose a portion of said ionic salt, the combustor combusting decomposition products of said portion with said additional fuel.

18. The apparatus of claim 1 wherein:

the reactor comprises a heated passageway.

19. The apparatus of claim 18 wherein:

all the propellant passes through the heated passageway to receive heat to promote the dissociating.

20. The apparatus of claim 18 wherein:

the heated passageway encircles a combustion products flow path portion.

21. The apparatus of claim 18 being a thruster, combustion products of the combustion exiting a nozzle to produce thrust.

22. The apparatus of claim 18 further comprising:

an annular space between a combustion chamber outer wall of the combustor and a combustion chamber inner wall for passing the propellant; and an igniter positioned to ignite the propellant reaching an upstream end of the combustion chamber, to discharge the combusting decomposition products downstream through an interior of the chamber inner wall.

23. The apparatus of claim 1 wherein said portion is a major portion.

24. The apparatus of claim 4 wherein said portion is a major portion.

25. The method of claim 6 wherein said portion is a major portion.

26. The apparatus of claim 9 wherein said portion is a major portion.

27. An apparatus comprising:

a source of HAN-based propellant;

a reactor for dissociating a portion of the HAN in the propellant;

a combustor having an upstream end and a downstream end for combusting products of the dissociation with an additional fuel in the propellant; and a nozzle downstream of the combustor, wherein the reactor is located between the combustion chamber and a throat of the nozzle.

28. The apparatus of claim 27 wherein said portion is a major portion.

* * * * *

UNITED STATES PATENT AND TRADEMARK OFFICE
CERTIFICATE OF CORRECTION

| | |
|---|---|
| PATENT NO. | : 6,931,832 B2 |
| APPLICATION NO. | : 10/436861 |
| DATED | : August 23, 2005 |
| INVENTOR(S) | : Gerald R. Berg et al. |

It is certified that error appears in the above-identified patent and that said Letters Patent is hereby corrected as shown below:

Column 6, claim 9, line 56, --said-- should be inserted after "combusting".

Signed and Sealed this

First Day of May, 2007

JON W. DUDAS
*Director of the United States Patent and Trademark Office*